(12) United States Patent
Niclass et al.

(10) Patent No.: US 10,795,001 B2
(45) Date of Patent: Oct. 6, 2020

(54) IMAGING SYSTEM WITH SYNCHRONIZED SCAN AND SENSING

(71) Applicant: Apple Inc., Cupertino, CA (US)

(72) Inventors: Cristiano L. Niclass, San Jose, CA (US); Alexander Shpunt, Portola Valley, CA (US); Gennadiy A. Agranov, San Jose, CA (US); Matthew C. Waldon, San Francisco, CA (US); Mina A. Rezk, Haymarket, VA (US); Thierry Oggier, San Jose, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/714,739

(22) Filed: Dec. 15, 2019

(65) Prior Publication Data

US 2020/0158831 A1 May 21, 2020

Related U.S. Application Data

(63) Continuation of application No. 15/586,286, filed on May 4, 2017.

(Continued)

(51) Int. Cl.
*G01C 3/08* (2006.01)
*G01S 7/481* (2006.01)
(Continued)

(52) U.S. Cl.
CPC .......... *G01S 7/4817* (2013.01); *G01S 7/4815* (2013.01); *G01S 7/4816* (2013.01); *G01S 7/4863* (2013.01);
(Continued)

(58) Field of Classification Search
None
See application file for complete search history.

(56) References Cited

U.S. PATENT DOCUMENTS 4,623,237 A 11/1986 Kaneda et al.
5,164,823 A 11/1992 Keeler
(Continued)

FOREIGN PATENT DOCUMENTS

EP 3318895 A1 5/2018
JP 09197045 A 7/1997

OTHER PUBLICATIONS

U.S. Appl. No. 15/586,286 office action dated Dec. 2, 2019.
(Continued)

*Primary Examiner* — Isam A Alsomiri
*Assistant Examiner* — Amir J Askarian
(74) *Attorney, Agent, or Firm* — Kligler & Associates Patent Attorneys Ltd

(57) ABSTRACT

An electro-optical device includes a laser light source, which is configured to emit at least one beam of light. A beam steering device is configured to transmit and scan the at least one beam across a target scene. In an array of sensing elements, each sensing element is configured to output a signal indicative of incidence of photons on the sensing element. Light collection optics are configured to image the target scene scanned by the transmitted beam onto the array, wherein the beam steering device scans the at least one beam across the target scene with a spot size and scan resolution that are smaller than a pitch of the sensing elements. Circuitry is coupled to actuate the sensing elements only in a selected region of the array and to sweep the selected region over the array in synchronization with scanning of the at least one beam.

18 Claims, 9 Drawing Sheets

Related U.S. Application Data

(60) Provisional application No. 62/353,589, filed on Jun. 23, 2016.

(51) Int. Cl.
*G01S 17/89* (2020.01)
*G01S 7/4863* (2020.01)
*G01S 17/10* (2020.01)
*G01S 17/42* (2006.01)
*G01S 7/4865* (2020.01)

(52) U.S. Cl.
CPC ............ *G01S 7/4865* (2013.01); *G01S 17/10* (2013.01); *G01S 17/42* (2013.01); *G01S 17/89* (2013.01)

(56) References Cited

U.S. PATENT DOCUMENTS

| | | | |
|---|---|---|---|
| 5,270,780 A | 12/1993 | Moran et al. | |
| 5,699,149 A | 12/1997 | Kuroda et al. | |
| 6,384,903 B1 | 5/2002 | Fuller | |
| 6,710,859 B2 | 3/2004 | Shirai et al. | |
| 7,193,690 B2 | 3/2007 | Ossig et al. | |
| 7,508,496 B2 | 3/2009 | Mettenleiter et al. | |
| 7,969,558 B2 | 6/2011 | Hall | |
| 8,675,181 B2 | 3/2014 | Hall | |
| 8,736,818 B2* | 5/2014 | Weimer | G01S 7/4815 356/4.07 |
| 8,766,808 B2* | 7/2014 | Hogasten | H01L 27/14609 340/632 |
| 8,925,814 B1 | 1/2015 | Schneider et al. | |
| 9,709,678 B2 | 7/2017 | Matsuura | |
| 9,874,635 B1* | 1/2018 | Eichenholz | G01S 7/4811 |
| 10,132,616 B2* | 11/2018 | Wang | G01B 11/22 |
| 10,386,487 B1 | 8/2019 | Wilton et al. | |
| 2002/0071126 A1 | 6/2002 | Shirai et al. | |
| 2004/0135992 A1 | 7/2004 | Munro | |
| 2007/0145136 A1 | 6/2007 | Wiklof et al. | |
| 2009/0262760 A1 | 10/2009 | Krupkin et al. | |
| 2009/0273770 A1 | 11/2009 | Bauhahn et al. | |
| 2009/0275841 A1 | 11/2009 | Melendez et al. | |
| 2010/0096459 A1 | 4/2010 | Gurevich | |
| 2010/0121577 A1 | 5/2010 | Zhang et al. | |
| 2010/0250189 A1 | 9/2010 | Brown | |
| 2010/0286516 A1 | 11/2010 | Fan et al. | |
| 2011/0181864 A1 | 7/2011 | Schmitt et al. | |
| 2012/0294422 A1 | 11/2012 | Cheung et al. | |
| 2013/0236171 A1 | 9/2013 | Saunders | |
| 2013/0278917 A1 | 10/2013 | Korekado et al. | |
| 2014/0077086 A1 | 3/2014 | Batkilin et al. | |
| 2014/0240317 A1 | 8/2014 | Go et al. | |
| 2014/0268127 A1 | 9/2014 | Day | |
| 2015/0192676 A1 | 7/2015 | Kotelnikov et al. | |
| 2015/0285625 A1* | 10/2015 | Deane | G01S 17/48 348/140 |
| 2016/0003944 A1 | 1/2016 | Schmidtke et al. | |
| 2016/0041266 A1* | 2/2016 | Smits | G01S 7/497 356/5.01 |
| 2016/0080709 A1 | 3/2016 | Viswanathan et al. | |
| 2016/0259038 A1 | 9/2016 | Retterath et al. | |
| 2017/0038459 A1 | 2/2017 | Kubacki et al. | |
| 2017/0067734 A1 | 3/2017 | Heidemann et al. | |
| 2017/0131388 A1* | 5/2017 | Campbell | G01S 7/4812 |
| 2017/0184709 A1 | 6/2017 | Kenzler et al. | |
| 2017/0242102 A1 | 8/2017 | Dussan et al. | |
| 2017/0242108 A1 | 8/2017 | Dussan et al. | |
| 2017/0257617 A1 | 9/2017 | Retterath | |
| 2017/0269209 A1 | 9/2017 | Hall et al. | |
| 2017/0303789 A1 | 10/2017 | Tichauer et al. | |
| 2017/0356796 A1 | 12/2017 | Nishio | |
| 2017/0356981 A1 | 12/2017 | Yang et al. | |
| 2018/0131449 A1 | 5/2018 | Kare et al. | |
| 2018/0167602 A1* | 6/2018 | Pacala | G02B 3/0056 |
| 2018/0205943 A1 | 7/2018 | Trail | |
| 2018/0299554 A1 | 10/2018 | Van Dyck et al. | |
| 2019/0011567 A1 | 1/2019 | Pacala et al. | |
| 2019/0018118 A1 | 1/2019 | Perenzoni et al. | |

OTHER PUBLICATIONS

International Application # PCT/US2019/45187 search report dated Nov. 15, 2019.
U.S. Appl. No. 15/586,286 office action dated Feb. 24, 2020.
U.S. Appl. No. 15/844,665 office action dated Jun. 1, 2020.
U.S. Appl. No. 15/950,186 office action dated Jun. 23, 2020.

* cited by examiner

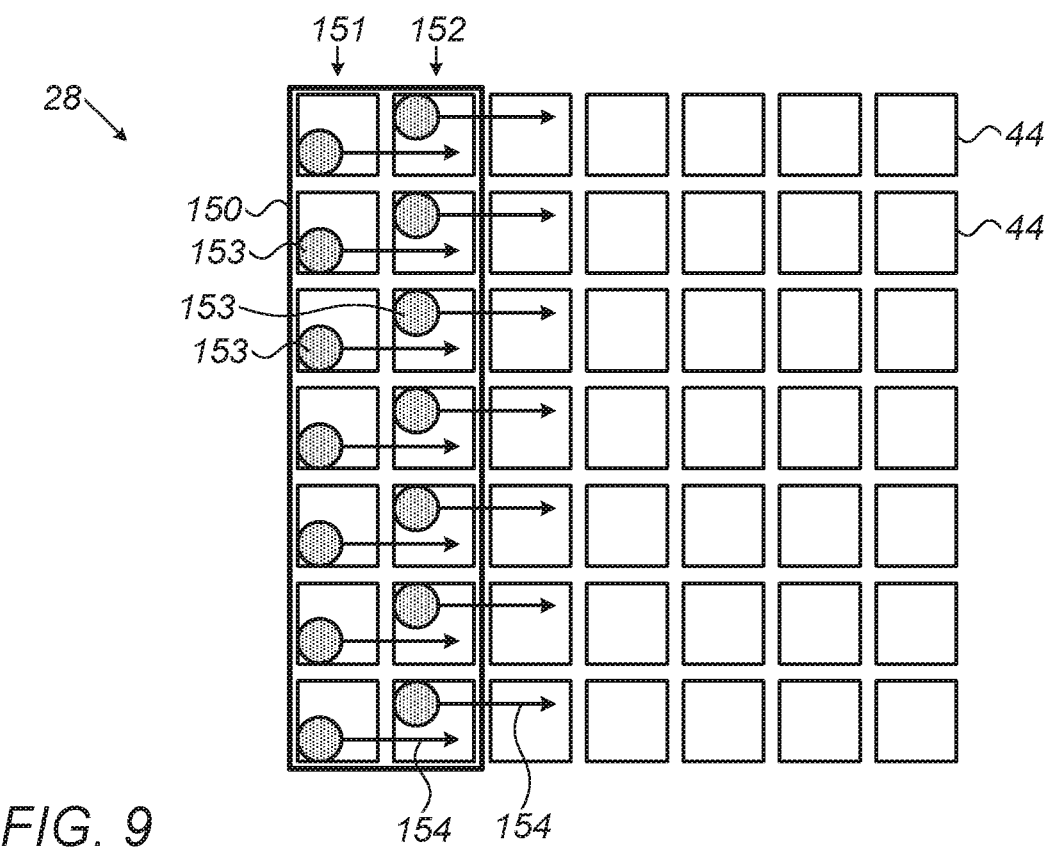
FIG. 9
FIG. 10
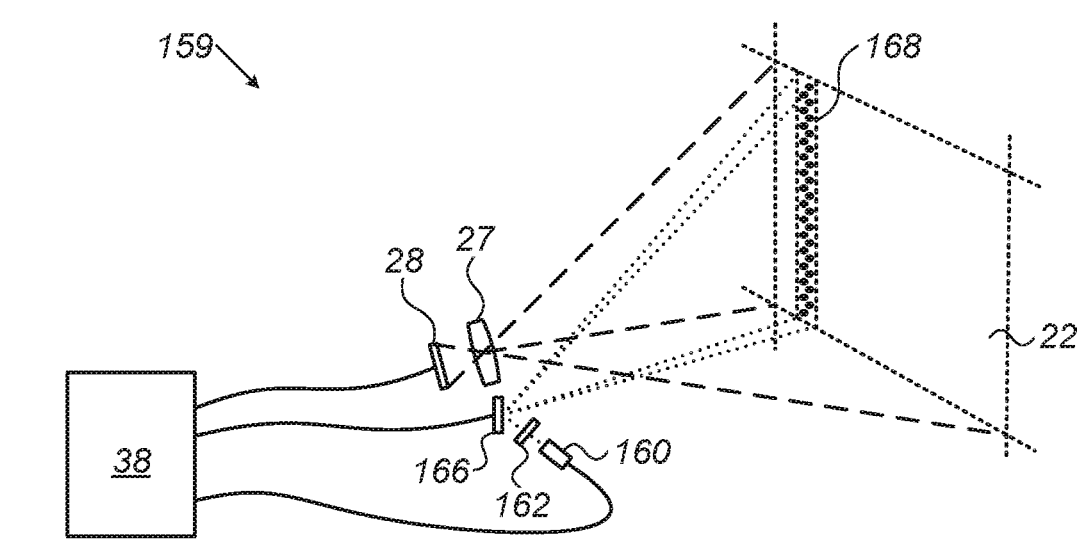

IMAGING SYSTEM WITH SYNCHRONIZED SCAN AND SENSING

CROSS-REFERENCE TO RELATED APPLICATION

This application is a continuation of U.S. patent application Ser. No. 15/586,286, filed May 4, 2017, which claims the benefit of U.S. Provisional Patent Application 62/353,589, filed Jun. 23, 2016.

FIELD OF THE INVENTION

The present invention relates generally to opto-electronic devices, and particularly to light detection and ranging (LiDAR) sensors.

BACKGROUND

Existing and emerging consumer applications have created an increasing need for real-time three-dimensional imagers. These imaging devices, also commonly known as light detection and ranging (LiDAR) sensors, enable the remote measurement of distance (and often intensity) of each point on a target scene—so-called target scene depth—by illuminating the target scene with an optical beam and analyzing the reflected optical signal. A commonly used technique to determine the distance to each point on the target scene involves sending an optical beam towards the target scene, followed by the measurement of the round-trip time, i.e. time-of-flight (ToF), taken by the optical beam as it travels from the source to target scene and back to a detector adjacent to the source.

A suitable detector for ToF-based LiDAR is provided by a single-photon avalanche diode (SPAD) array. SPADs, also known as Geiger-mode avalanche photodiodes (GAPDs), are detectors capable of capturing individual photons with very high time-of-arrival resolution, of the order of a few tens of picoseconds. They may be fabricated in dedicated semiconductor processes or in standard CMOS technologies. Arrays of SPAD sensors, fabricated on a single chip, have been used experimentally in 3D imaging cameras. Charbon et al. provide a useful review of SPAD technologies in "SPAD-Based Sensors," published in TOF Range-Imaging Cameras (Springer-Verlag, 2013), which is incorporated herein by reference.

In a SPAD, a p-n junction is reverse-biased at a level well above the breakdown voltage of the junction. At this bias, the electric field is so high that a single charge carrier injected into the depletion layer, due to an incident photon, can trigger a self-sustaining avalanche. The leading edge of the avalanche current pulse marks the arrival time of the detected photon. The current continues until the avalanche is quenched by lowering the bias voltage down to or below the breakdown voltage. This latter function is performed by a quenching circuit, which may simply comprise a high-resistance ballast load in series with the SPAD, or may alternatively comprise active circuit elements.

SUMMARY

Embodiments of the present invention that are described hereinbelow provide improved LiDAR sensors and methods of their use.

There is therefore provided, in accordance with an embodiment of the present invention, an electro-optical device, which includes at least one laser light source configured to emit at least one beam of light pulses having an emissive power selectable between a low level and a high level. A beam steering device is configured to transmit and scan the at least one beam across a target scene. One or more sensing elements are configured to output a signal indicative of a time of incidence of a single photon on the sensing element. Light collection optics are configured to image the target scene scanned by the at least one transmitted beam onto the one or more sensing elements.

Circuitry is coupled to process signals output by the one or more sensing elements in order to determine respective distances to points in the target scene, to control the at least one laser light source to emit the at least one beam at the low level during a first scan of the beam steering device over the target scene, to identify, based on the first scan, the points in the scene that are located at respective distances from the device that are greater than a predefined threshold distance, and to control the at least one laser light source during a second scan of the beam steering device, subsequent to the first scan, to emit the at least one beam at the high level while the beam steering device directs the at least one beam toward the identified points.

In the disclosed embodiments, the at least one laser light source includes a laser light source having an output selectable between the low level and the high level. Alternatively or additionally, the at least one laser light source includes at least two lasers, including at least a first laser configured to emit the light pulses at the low level, and at least a second laser configured to emit the light pulses at the high level. In some embodiments, the circuitry is configured to set at least one of a timing and a sensitivity of the sensing elements to different, respective values during the first scan and during the second scan.

In a disclosed embodiment, the circuitry is configured to control the at least one laser light source during the second scan to direct the at least one beam at the high level only at the points that were identified as being located at respective distances from the device that are greater than the predefined threshold distance.

In some embodiments, the one or more sensing elements include an array of the sensing elements, and the circuitry is configured to actuate the sensing elements only in a selected region of the array and to sweep the selected region over the array in synchronization with scanning of the at least one beam. In a disclosed embodiment, the sensing elements include single-photon detectors, such as single-photon avalanche diodes (SPADs).

There is also provided, in accordance with an embodiment of the invention, a method for sensing, which includes selecting a laser light source emissive power between a low level and a high level, and emitting at least one beam of light pulses having a selected emissive power. The at least one beam is transmitted and scanned across a target scene. One or more sensing elements are provided and are configured to output a signal indicative of a time of incidence of a single photon on the sensing element. The target scene scanned by the at least one transmitted beam is imaged onto the one or more sensing elements. Signals output by the one or more sensing elements are processed in order to determine respective distances to points in the target scene. The at least one laser light source is controlled to emit the at least one beam at the low level during a first scan of the beam steering device over the target scene. Based on the first scan, the points in the scene that are located at respective distances from the device that are greater than a predefined threshold distance are identified, and the at least one laser light source is controlled during a second scan of the beam steering device, subsequent to the first scan, to emit the at least one beam at the high level while directing the at least one beam toward the identified points.

The present invention will be more fully understood from the following detailed description of the embodiments thereof, taken together with the drawings in which:

BRIEF DESCRIPTION OF THE DRAWINGS

FIG. 9 is a schematic illustration of a detector array with a staggered array of illumination spots scanned in a one-dimensional scan, in accordance with an embodiment of the invention;

FIG. 10 is a schematic illustration of a LiDAR device implementing a one-dimensional scan, in accordance with an embodiment of the invention;

DETAILED DESCRIPTION OF EMBODIMENTS

Overview

Figure 1:
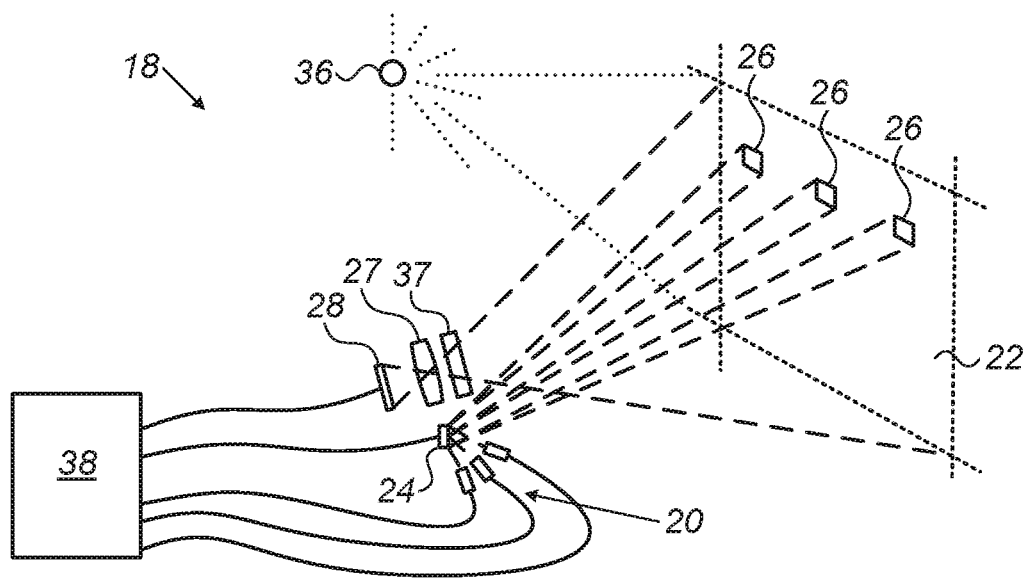
FIG. 1 is a schematic illustration of a LiDAR system, in accordance with an embodiment of the invention.

The quality of the measurement of the distance to each point in a target scene (target scene depth) using a LiDAR is often compromised in practical implementations by a number of environmental, fundamental, and manufacturing challenges. An example of environmental challenges is the presence of uncorrelated background light, such as solar ambient light, in both indoor and outdoor applications, typically reaching an irradiance of 1000 W/m². Fundamental challenges are related to losses incurred by optical signals upon reflection from the target scene surfaces, especially due to low-reflectivity target scenes and limited optical collection aperture, as well as electronic and photon shot noises. These limitations often generate inflexible trade-off relationships that typically push the designer to resort to solutions involving large optical apertures, high optical power, narrow field-of-view (FoV), bulky mechanical construction, low frame rate, and the restriction of sensors to operate in controlled environments.

The embodiments of the present invention that are described herein address the above limitations so as to enable compact, low-cost LiDARs achieving accurate high-resolution depth imaging that can operate in uncontrolled environments. The disclosed embodiments use one or more pulsed laser sources emitting beams to generate high-irradiance illumination spots at the intersections of the axes of the emitted beams with the target scene. The beams and hence the illumination spots are scanned across the target scene. The illumination reflected from the target scene is imaged by collection optics onto and detected by a time-of-flight, single-photon detector array for high signal-to-noise ratio, with the distance to each point of the target scene derived from the time-of-flight data.

Imaging of the target scene onto the detector array generates a one-to-one correspondence between locations in the target scene and locations on the detector array, defined by geometrical optics, as is known in the art. Thus, an area of the target scene is imaged onto a corresponding image area on the detector, with a linear length in the image given by multiplying the corresponding length in the target scene area by the optical magnification M, wherein for LiDAR systems typically $M \ll 1$. Similarly, a sensing element of the detector array can be thought of as imaged back onto the target scene with magnification $1/M$, giving the location and area of the target scene that is "seen" by the sensing element.

In the disclosed embodiments, the detector array comprises a two-dimensional array of single-photon time-sensitive sensing elements, such as single-photon avalanche diodes (SPADs). By addressing each SPAD individually via a dedicated control circuitry, the sensitivity, including the on/off-state, of each SPAD is controlled by its specific reverse p-n junction high voltage. In some embodiments the SPADs work as individual sensing elements, whereas in other embodiments several SPADs are grouped together into super pixels. At any instant during a scan, only the sensing elements in the area or areas of the array that are to receive reflected illumination from a scanned beam are actuated. The sensing elements are thus actuated only when their signals provide useful information. This approach both reduces the background signal, which would lower the signal-to-background ratio, and lowers the electrical power needs of the detector array.

A LiDAR measures the distance to the target scene for a set of discrete points with a finite averaging area associated with each point. In the disclosed embodiments, the parameters of the measurement, as well as the actuation of sensing elements, are affected by the following system parameters of the LiDAR:

1) The size of the illumination spots,
2) The resolution of the beam steering device (the size of the steps or excursion of the beam steering device between successive measurements of distance), and
3) The size of the super pixels of the detector array, or in other words, the number of sensing elements that are binned together in the ToF measurement (including the case in which one sensing element is used as a super pixel).

The effect of the LiDAR system parameters can be divided into two cases:

a) Small-spot case, wherein the illumination spot is smaller than the size of the super pixel, and b) Large-spot case, wherein the illumination spot is larger than the size of the super pixel The comparison of sizes is made by viewing both the illumination spot and the super pixel in the same optical plane (either in the target scene or on the detector array). These two cases can be summarized in the following table, with the cases detailed further in the context of the figures.

TABLE 1

Impact of LiDAR system parameters

| | a) Illumination spot < Super pixel | b) Illumination spot > Super pixel |
|---|---|---|
| Location of measurement point in target scene determined by: | Intersection point of the beam axis with the target scene | Super pixel location as projected onto the target scene |
| Lateral resolution in target scene determined by: | Beam steering device resolution | Super pixel size as projected onto the target scene |
| Measurement averaging area on target scene determined by: | Illumination spot size | Super pixel size as projected onto the target scene |
| State of beam steering device determines: | Measurement point location in target scene; Selection of actuated super pixels | Selection of actuated super pixels |

In some embodiments of the present invention, the target scene is illuminated and scanned by either one laser beam or by multiple beams. In some embodiments utilizing multiple beams, these beams are generated by splitting a laser beam using diffractive optical elements, prisms, beamsplitters, or other optical elements that are known in the art. In other embodiments, multiple beams are generated using several discrete laser light sources. In some of these embodiments, the multiple beams are generated using a monolithic laser array, such as an array of VCSELs or VECSELs.

In some embodiments, a beam steering device, such as a scanning mirror, is operated to scan the target scene with a single light beam in a two-dimensional raster scan. (A raster scan generally comprises long, approximately straight back-and-forth scans, so-called scan lines, along with short movements transferring the scan point from one scan line to the next). A raster pattern is described here by way of example, and alternative scan patterns implementing similar principles are considered to be within the scope of the present invention. When a single light beam is used, the scan resolution in the direction perpendicular to the scan lines of the raster scan is given by the separation between successive scan lines. The scan resolution can be increased by decreasing the separation between successive scan lines, but this sort of resolution increase will come at the expense of reduced frame rate, since a larger number of scan lines is required to cover the scene. Alternatively, the resolution may be increased at the expense of reduced field of view if the number of scan lines per frame is unchanged. Mechanical constraints put a limit on the degree to which the scanning speed of the mirror can be increased in order to offset these effects.

In an embodiment, the scan resolution in the direction perpendicular to the scan lines is increased by using multiple light beams, spread transversely relative to the scan line direction as well as in the scan line direction. The separation of the light beams along the scan line is configured so that each light beam illuminates a separate super pixel on the detector array, in order to identify individually each light beam. The transverse separation of the light beams, rather than the scan line density, now determines the scan resolution. The disclosed embodiment achieves an increase in the lateral resolution without reducing the size of the sensing elements, thus mitigating the miniaturization requirements for the detector array.

In another embodiment, multiple illumination spots are scanned across the target scene in a linear scan. (A linear scan in this context includes scans along a single direction in which the scan line is distorted from a straight line due to optical or mechanical imperfections.) Employing a one-dimensional, linear scan permits the use of a simpler and cheaper beam steering device than for a two-dimensional scan, but the number of light beams to cover the target scene with sufficiently high resolution is generally higher than that required for a two-dimensional scan. A single-column scan can be implemented with multiple light beams configured in a column perpendicular to the scan line, generating one column of illumination spots. The highest scan resolution in the direction of the axis of the column is attained when each illumination spot is imaged onto a separate sensing element in the detector array.

In another embodiment utilizing a linear scan, the scan resolution perpendicular to the scan line is increased by generating multiple columns of illumination spots, perpendicular to the scan line and mutually offset in the direction of the axes of the columns. The multiple columns are also mutually offset in the direction of the scan line by at least one sensing element, so as to have each illumination spot illuminate a separate sensing element, and thus permit each illumination spot to be separately identified. This embodiment achieves an increase in the lateral resolution without reducing the size of the sensing elements, thus mitigating the miniaturization requirements for the detector array.

Some embodiments of the present invention provide LiDAR systems with a wide angular field-of-view (FoV), covering a large depth range. As implementing high-efficiency, wide-FoV optics leads to bulky and expensive components, these embodiments apply dedicated designs and use-modes of laser light sources, detector arrays, electronics, and algorithms to measure scene depths over a wide range of FoVs and distances, while keeping the optical design and construction simple.

The considerations for the laser light source relate to its emissive power: If one were to use only low emission-power laser light sources for target scene scanning, the signal received by the detector array from distant points of the target scene would be too weak for a robust and accurate measurement. If, on the other hand, one were to use only high emission-power laser light sources, capable of measuring distant target scene points, unnecessarily high emissive power would be used by the LiDAR for nearby target scene points, increasing the electrical power consumption of the LiDAR. Therefore, in some embodiments of the invention, the laser light source emissive power is adjusted according to the measured distance.

System Description

FIG. 1 shows schematically a LiDAR system 18, in accordance with an embodiment of the invention. The beam or beams from a laser light source 20, comprising one or more pulsed lasers, are directed to a target scene 22 by a dual-axis beam-steering device 24, forming and scanning illumination spots 26 over the target scene. (The term "light" is used herein to refer to any sort of optical radiation, including radiation in the visible, infrared, and ultraviolet ranges.) Beam-steering devices can comprise, for example, a scanning mirror, or any other suitable type of optical deflector or scanner that is known in the art. Illumination spots 26 are imaged by collection optics 27 onto a two-dimensional detector array 28, comprising single-photon, time-sensitive sensing elements, such as SPADs.

Target scene 22 is also illuminated, besides illumination spots 26, by an ambient light source 36, such as the sun. In order to achieve a high signal-to-background ratio, the irradiance of the illumination spots is chosen to be much higher than that of the ambient illumination, which can reach up to 1000 W/m² due to irradiance from the sun, for example. A band-pass filter 37 is used for further reduction of ambient illumination on detector array 28.

A control circuit 38 is connected to laser light source 20, timing the pulse emissions and controlling their emissive power, and to dual-axis beam-steering device 24, controlling the scan of illumination spots 26. In addition, control circuit 38 adjusts dynamically the reverse p-n junction high voltage of each SPAD of detector array 28, thus controlling the actuation and sensitivity of each SPAD. Utilizing the known timing of pulses from laser light source 20 and the known state of dual-axis beam-steering device 24, which determines the position of illumination spots 26 on target scene 22, control circuit actuates only those SPADs onto which, at any given moment, the illumination spots are imaged by collection optics 27. Utilizing further the above knowledge of laser light source 20 and beam steering device 24, as well as the signals read from detector array 28, control circuit 38 determines the distance to each scanned point in target scene 22 using the time-of-flight measured from the laser light source to the detector array.

Figure 2:
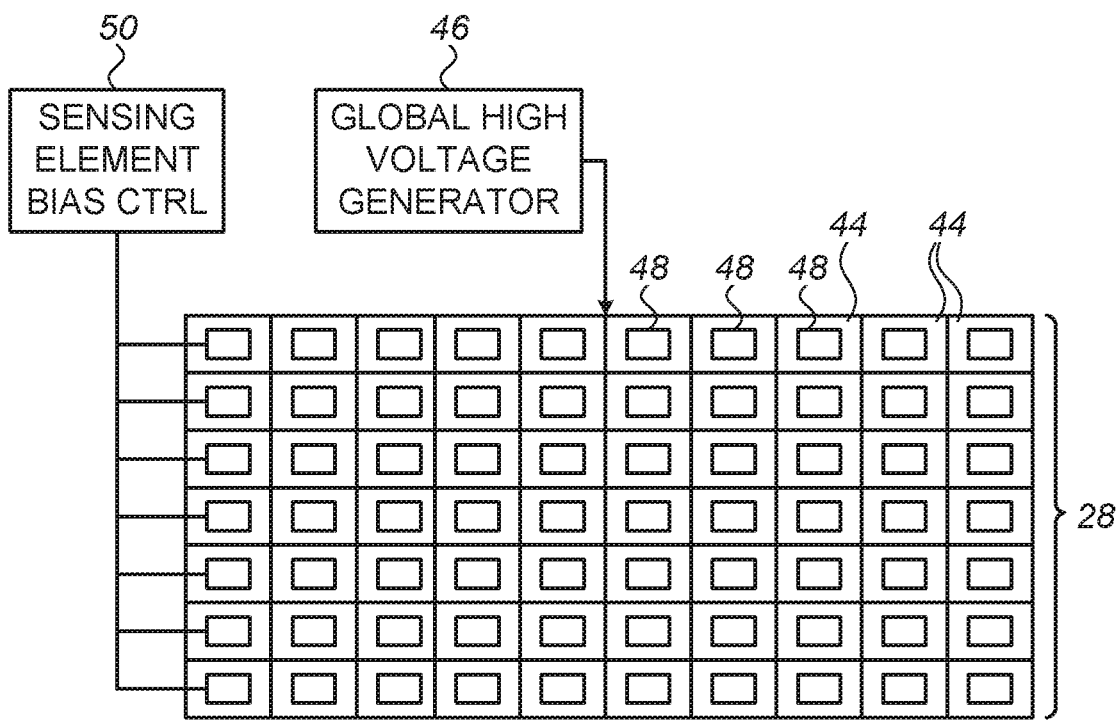
FIG. 2 is a block diagram that schematically illustrates a SPAD-based sensing device, in accordance with an embodiment of the invention.
Figure 3:
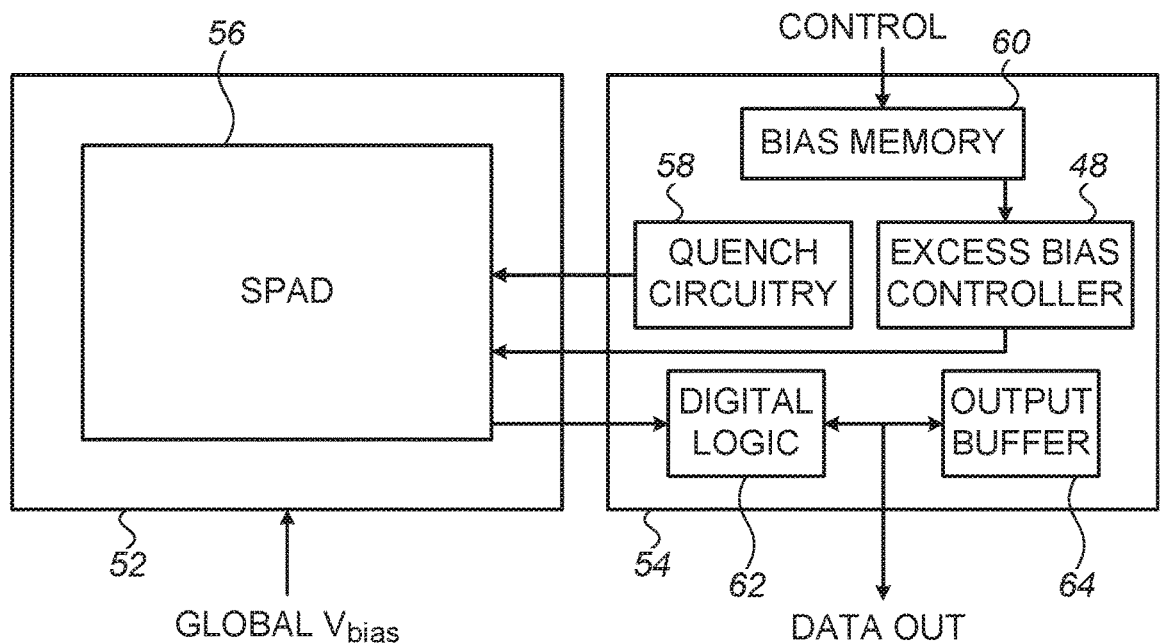
FIG. 3 is a block diagram showing components of a sensing element in a SPAD array, in accordance with an embodiment of the invention.
Figure 4:
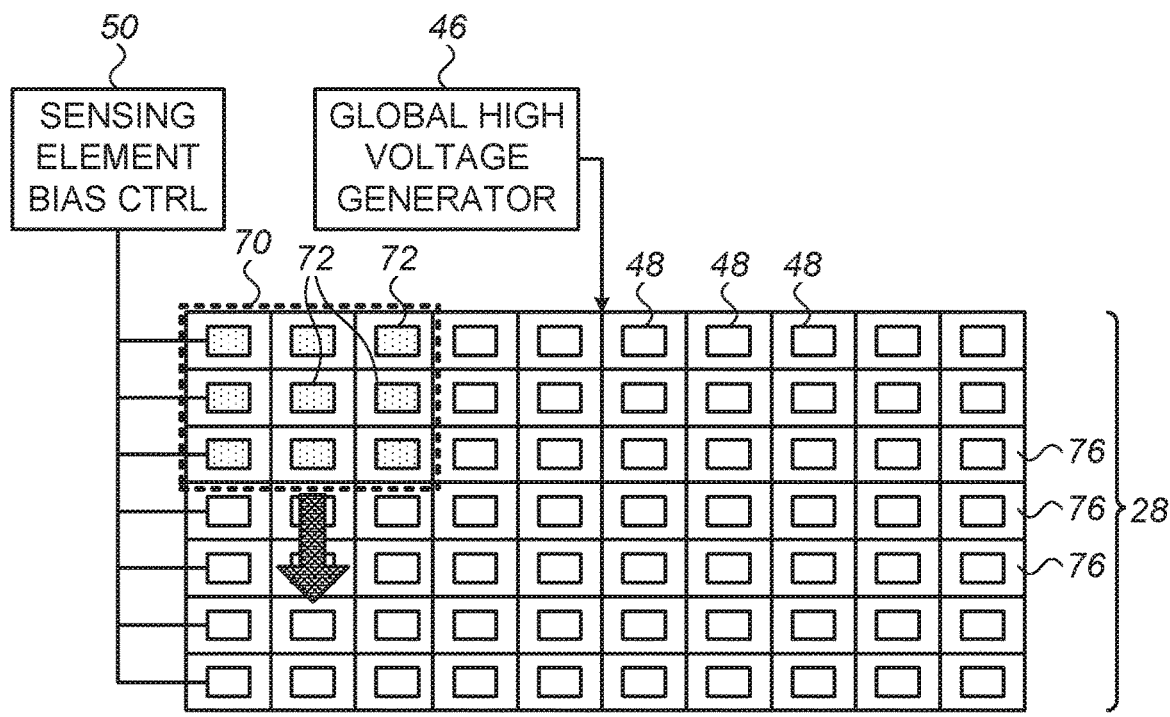
FIG. 4 is a block diagram that schematically illustrates a SPAD array with a scanned region of sensitivity, in accordance with an embodiment of the invention.

FIGS. 2-4 illustrate schematically the architecture and functioning of detector array 28, in accordance with embodiments of the invention. These figures show one possible scheme that can be used for selectively actuating the SPAD-based sensing elements in the array, using a combination of global and local bias controls. Alternatively, other sorts of biasing and actuation schemes, as well as other sorts of single-photon sensing elements, may be used for these purposes.

FIG. 2 is a block diagram that schematically illustrates detector array 28, in accordance with an embodiment of the invention. Detector array 28 comprises sensing elements 44, each comprising a SPAD and associated biasing and processing circuits, as described further hereinbelow. A global high-voltage bias generator 46 applies a global bias voltage to all of sensing elements 44 in array 28. In addition, a local biasing circuit 48 in each sensing element 44 applies an excess bias, which sums with the global bias in the sensing element. A sensing element bias control circuit 50 sets the excess bias voltages applied by local biasing circuits 48 to different, respective values in different sensing elements. Both global high-voltage bias generator 46 and sensing element bias control circuit 50 are connected to control circuit 38 (FIG. 1).

FIG. 3 is a block diagram showing components of one of sensing elements 44 in array 28, in accordance with an embodiment of the invention. In the disclosed embodiment array 28 comprises a two-dimensional matrix of the sensing elements formed on a first semiconductor chip 52, with a second two-dimensional matrix of bias control and processing circuits formed on a second semiconductor chip 54. (Only a single element of each of the two matrices is shown.) Chips 52 and 54 are coupled together so that the two matrices are in a one-to-one correspondence, whereby each sensing element on chip 52 is in contact with the corresponding bias control and processing elements on chip 54.

Both of chips 52 and 54 may be produced from silicon wafers using well-known CMOS fabrication processes, based on SPAD sensor designs that are known in the art, along with accompanying bias control and processing circuits as described herein. Alternatively, the designs and principles of detection that are described herein may be implemented, mutatis mutandis, using other materials and processes. For example, all of the components shown in FIG. 3 may be formed on a single chip, or the distribution of the components between the chips may be different. All such alternative implementations are considered to be within the scope of the present invention.

Sensing element 44 comprises a SPAD 56, comprising a photosensitive p-n junction, as is known in the art. Peripheral circuits including a quenching circuit 58 and local biasing circuit 48, are typically located on chip 54. As explained above, the actual bias applied to SPAD 56 is a sum of the global bias voltage $V_{bias}$ provided by bias generator 46 (FIG. 2) and an excess bias applied by biasing circuit 48. Sensing element bias control circuit 50 (FIG. 2) sets the excess bias to be applied in each sensing element by setting a corresponding digital value in a bias memory 60 on chip 54.

In response to each captured photon, SPAD 56 outputs an avalanche pulse, which is received by processing circuits on chip 54, including digital logic 62 and a memory configured as an output buffer 64. These processing elements can be configured, for example, to function as a time-to-digital converter (TDC), which measures the delay of each pulse output by SPAD 56 relative to a reference time and outputs a digital data value corresponding to the delay. Alternatively or additionally, logic 62 and buffer 64 may measure and output other sorts of values, including (but not limited to) a histogram of pulse delay times, a binary waveform, or a multi-level digital waveform. The outputs from chip 54 are connected to control circuit 38 (FIG. 1).

FIG. 4 is a block diagram that schematically illustrates SPAD array 28 with a scanned region 70 of sensitivity, in accordance with an embodiment of the invention. In this case, bias control circuit 50 sets the bias voltages of sensing elements 72 within region 70 to higher values than the remaining sensing elements 76, wherein the bias voltage is set so that sensing elements 76 are turned off. Bias control circuit 50 modifies the bias voltages of sensing elements 44 dynamically, however, so as to sweep region 70 across the array, as illustrated by the arrow in the figure. Circuit 50 may, for example, sweep region 70 in a raster scan, in synchronization with the scanning of a laser beam across a target scene being imaged onto array 28 (as is illustrated in the figures that follow).

As noted earlier, this embodiment is useful, inter alia, in tailoring the sensitive region of array 28 to the shape of an illuminating light beam or of an area of interest in a target scene being imaged, thus maximizing sensitivity of array 28 relative to power consumption, while reducing background noise from sensing elements that will not contribute to the signal.

In an alternative embodiment of the invention (illustrated in FIG. 9, for example), bias control circuit 50 sets the local bias voltages so that region 70 has a linear shape, extending along one or more columns of array 28 and matching the linear shape of an illumination beam or array of beams. Circuit 50 may then sweep this linear region 70 across array 28 in synchronization with the illumination beam. Alternatively, other scan patterns may be implemented, including both regular and adaptive scan patterns.

Example Scan Patterns and Super Pixels

Figure 5:
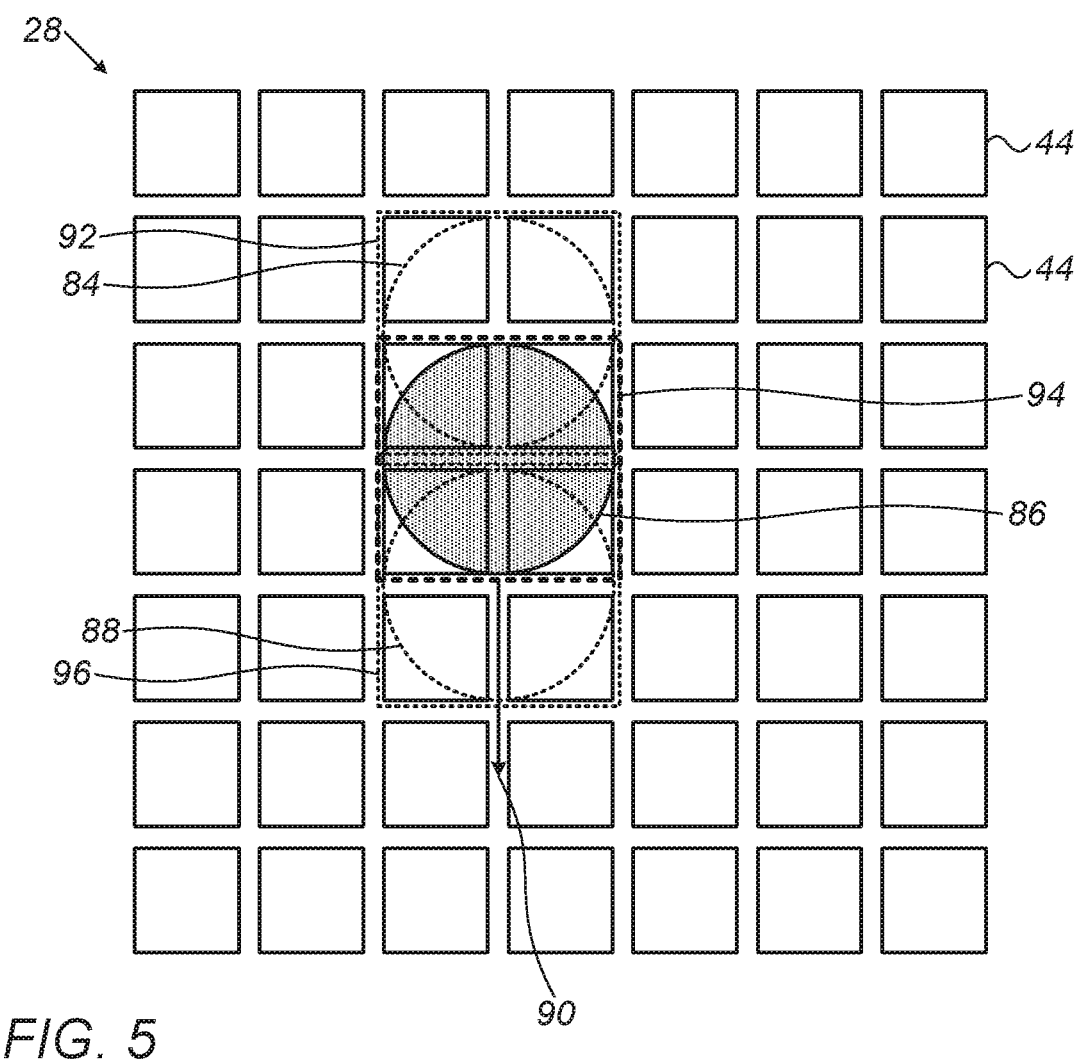
FIG. 5 is a schematic illustration of a detector array with a circular scanned illumination spot, in accordance with an embodiment of the invention.

FIG. 5 is a schematic illustration showing detector array 28 with the image of a circular scanned illumination spot 26 (FIG. 1) superimposed on the array, in accordance with an embodiment of the invention. The moving image of illumination spot 26, as cast on detector array 28 by collection optics 27, is observed at three consecutive points in time: $t=t_{i-1}$, $t=t_i$, and $t=t_{i+1}$. The images of scanned illumination spot 26 for these three consecutive points in time are denoted by circles 84, 86, and 88, respectively, with their diameters, in this example, twice the pitch of sensing elements 44. An arrow 90 indicates the direction of the scan of the image of scanned illumination spot 26, with the expected position of the image of the scanned illumination spot determined from the knowledge of the state of beam steering device 24.

At each point in time, sensing elements 44 in a region of array 28 that best matches the position of the image of illumination spot 26 at that point of time are actuated. These actuated sensing elements can be regarded as a sort of "super pixel." In the embodiment shown in FIG. 5, each super pixel comprises an array of 2×2 sensing elements, but in some embodiments the size of the super pixel takes other values either statically or dynamically.

At the time $t=t_{i-1}$ a super pixel 92 is actuated (encompassing circle 84); at the time $t=t_i$ a super pixel 94 is actuated (circle 86); and at the time $t=t_{i+1}$ a super pixel 96 is actuated (circle 88). Thus, in the pictured embodiment, each sensing element 44 is associated with two neighboring super pixels. Only those sensing elements within the active super pixel are actuated at a given moment, with the rest of the sensing elements turned off by lowering their bias voltage to a level at which avalanche multiplication is not sustainable. This operation maximizes the collection of the optical signal from the image of scanned illumination spot 26, while reducing the exposure to target scene background illumination uncorrelated to the illumination spot, thus increasing the signal-to-background ratio of array 28. In some embodiments of the invention, the output of the sensing elements that are not illuminated by the image of scanning spot 26 are masked out using standard logic gates.

The lateral resolution of target scene 22 in the direction of the scan is determined by the discrete step size of the scan (as determined by the scan speed and laser pulse repetition rate), which in this embodiment is one pitch of sensing elements 44. The area over which the target scene distance is averaged is (approximately) the area of a super pixel.

Figure 6:
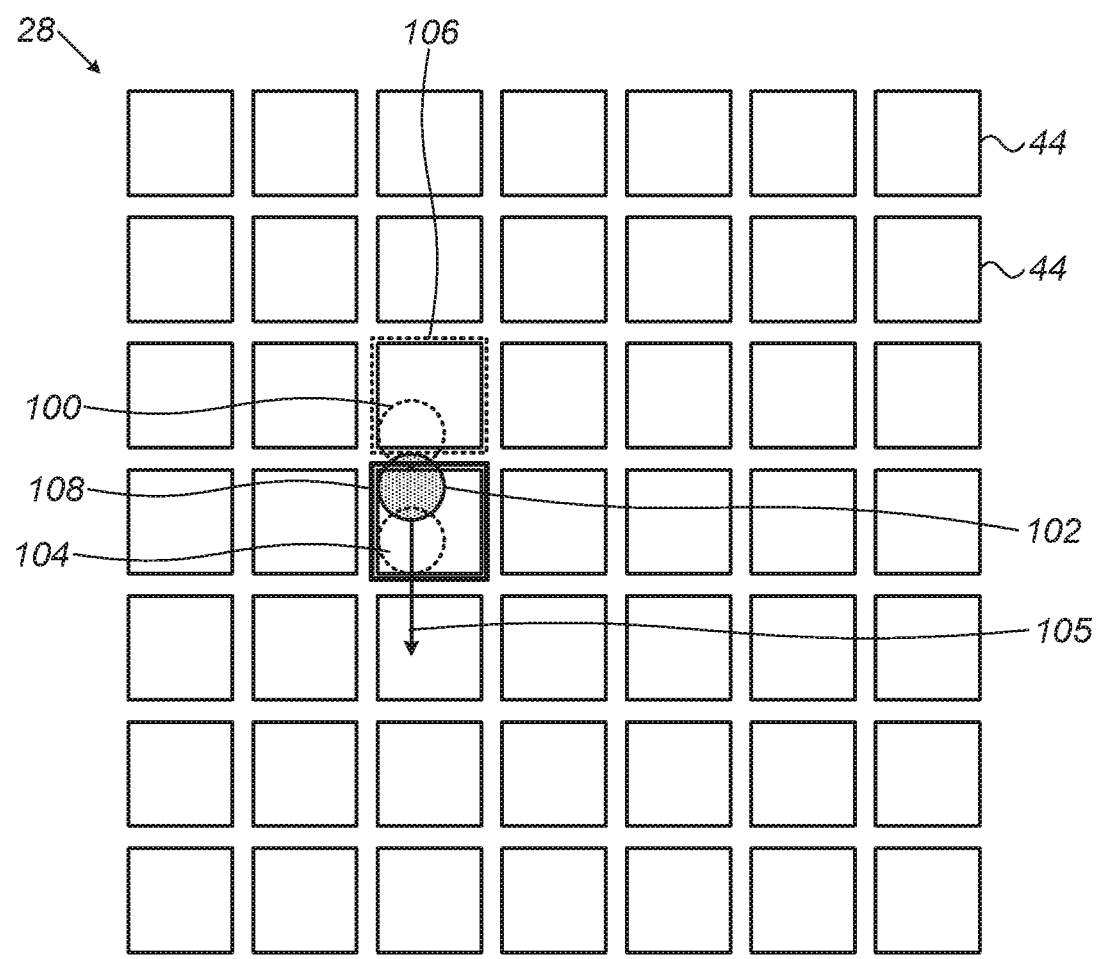
FIG. 6 is a schematic illustration of a detector array with a circular scanned illumination spot, in accordance with another embodiment of the invention.

FIG. 6 is a schematic illustration showing detector array 28 with the image of a circular scanned illumination spot 26 (FIG. 1) superimposed on the array, in accordance with another embodiment of the invention. The moving image of the illumination spot is observed at three consecutive points in time: $t=t_{i-1}$, $t=t_i$, and $t=t_{i+1}$. Both the diameter of the image of the scanned illumination spot and the scanning step between two consecutive points in time are half of the pitch of sensing elements 44. The images of scanned illumination spot 26 for the three consecutive points in time are denoted by circles 100, 102, and 104, respectively. An arrow 105 indicates the direction of the scan, with the expected position of the image determined from the knowledge of the state of beam steering device 24. In this embodiment a super pixel of a single sensing element 44 is used, with super pixel 106 actuated for $t=t_{i-1}$, and super pixel 108 actuated for both $t=t_i$ and $t=t_{i+1}$. The lateral resolution of the target scene 22 image in the direction of the scan is half of the pitch of sensing elements 44, and the area of target scene over which the distance is averaged is the area of illumination spot 26.

Figure 7A:
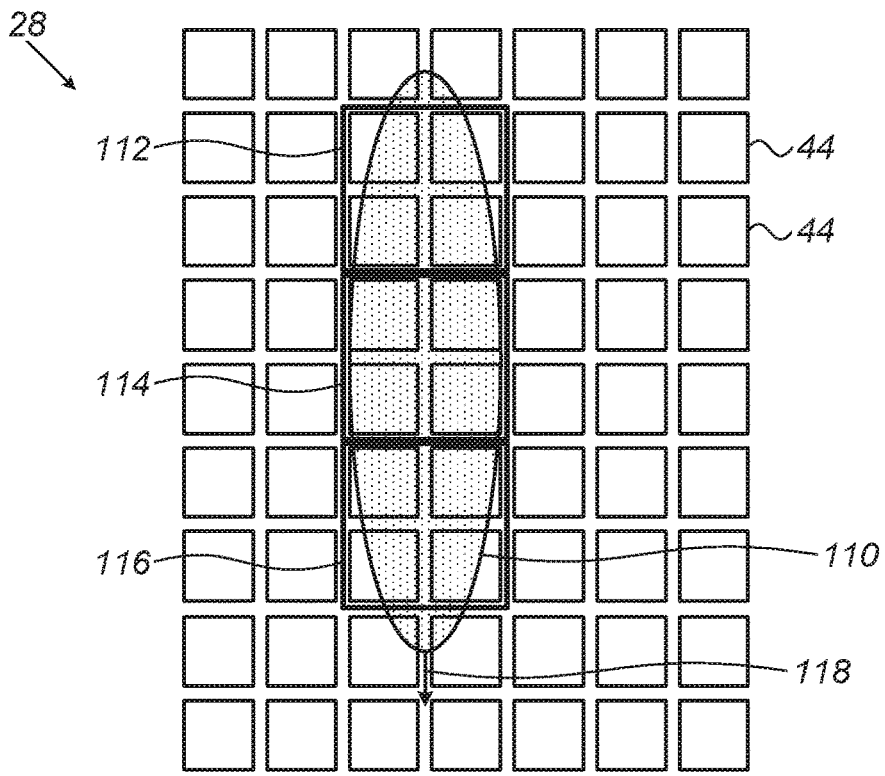
FIGS. 7A-C are a schematic illustrations of a detector array with an elliptical scanned illumination spot, in accordance with yet another embodiment of the invention.
Figure 7B:
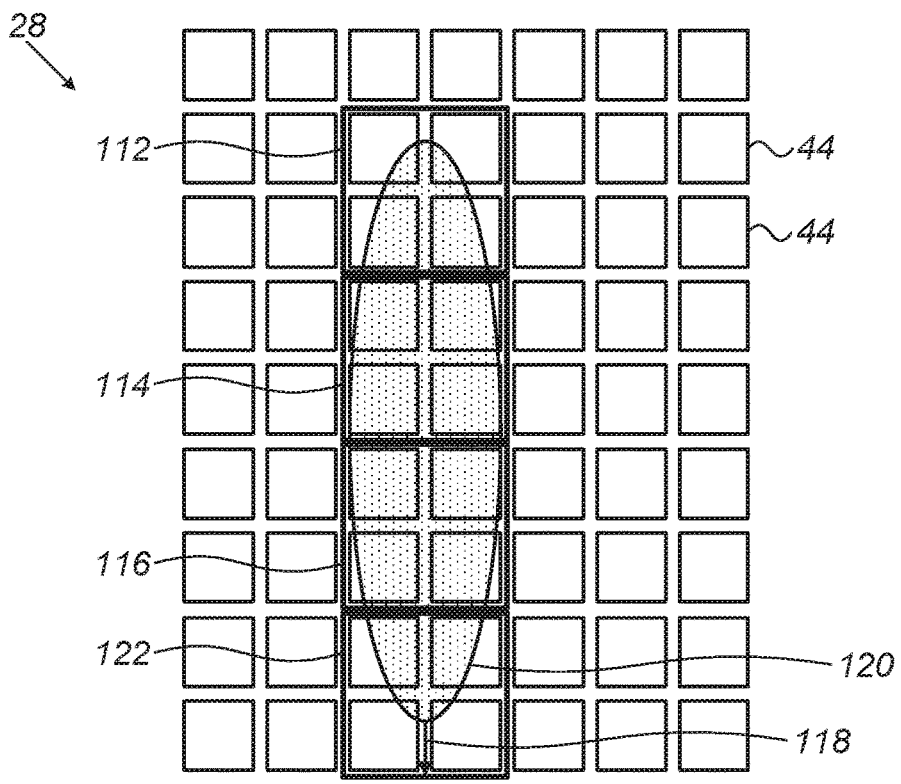
Figure 7C:
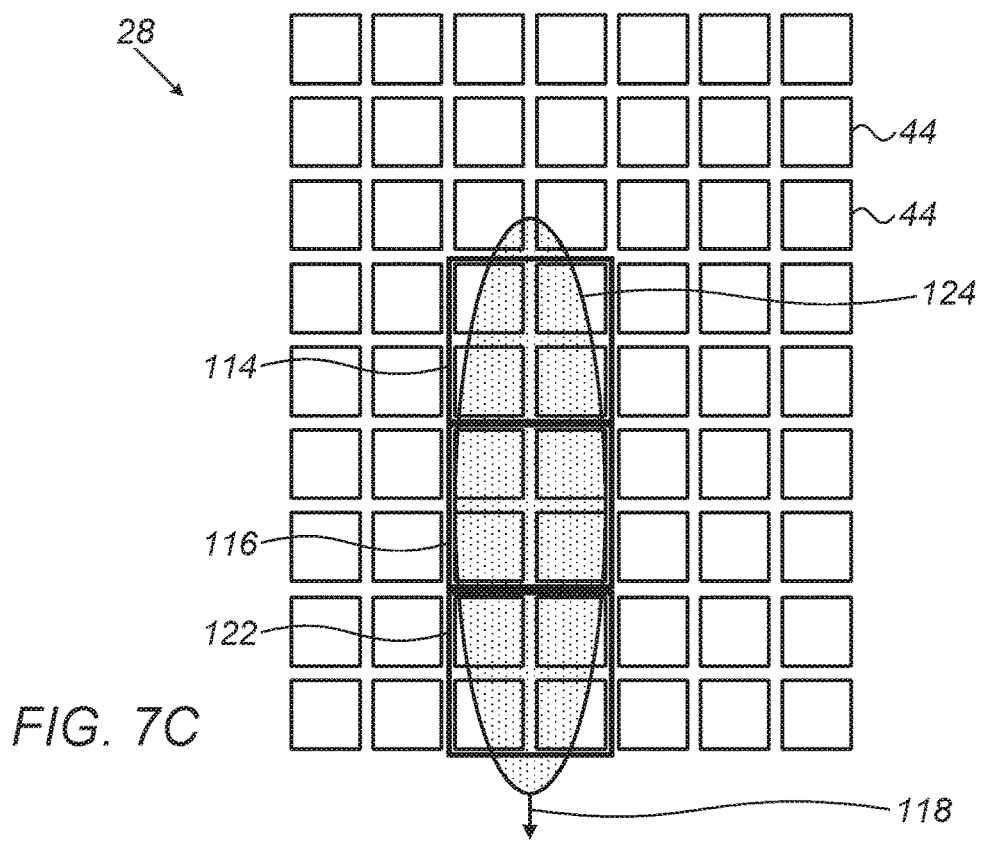

FIGS. 7A-C are schematic illustrations showing detector array 28 with the image of an elliptical scanned illumination spot 26 (FIG. 1) superimposed on the array, in accordance with yet another embodiment of the invention. An elliptical illumination spot is obtained, for instance, from an edge-emitting laser diode in which the emitting junction cross-section is a rectangle with a high aspect ratio. In this embodiment, an elliptical illumination spot 26 with an aspect ratio of 3-to-1 is illustrated, although other aspect ratios can be used in other embodiments. The extent of the so-called fast axis (long dimension) of the elliptical image of illumination spot 26 on detector array 28 is roughly six times the pitch of sensing elements 44, and the extent of the slow axis (short dimension) is twice the pitch. FIGS. 7A-C show schematically, similarly to FIGS. 5-6, the moving image of illumination spot 26 at three consecutive points in time: $t=t_{i-1}$, $t=t_i$ and $t=t_{i+1}$. Each scan step on detector array 28 is one pitch of sensing elements 44. In this embodiment, super pixels of 2×2 sensing elements are used.

FIG. 7A shows schematically an illumination spot 110, which is the image of scanned illumination spot 26 at the time $t=t_{i-1}$. The super pixels actuated at this time, based on the expected position of illumination spot 110, are pixels 112, 114, and 116 (the farthest top and bottom tips of the illumination spot are ignored, as they would contribute very little to the signal). An arrow 118 indicates the direction of the scan, with the expected position of illumination spot 110 determined from the knowledge of the state of beam steering device 24.

FIG. 7B shows schematically an illumination spot 120, which is the image of scanned illumination spot 26 at the time $t=t_i$. The super pixels actuated at this time, based on the expected position of illumination spot 120, are 112, 114, 116, and 122. Now four super pixels are actuated, since a significant portion of illumination spot 120 (top of ellipse) is still within pixel 112, and another significant portion (bottom of ellipse) has entered pixel 122. Super pixels 112, 114, and 116 continue collecting the signal so as to improve the signal-to-noise ratio. As in FIG. 7A, arrow 118 indicates the direction of the scan, with the expected position of illumination spot 120 at $t=t_i$ determined from the knowledge of the state of beam steering device 24.

FIG. 7C shows schematically an illumination spot 124, which is the image of scanned illumination spot 26 at time $t=t_{i+1}$. The super pixels actuated at this time, based on the expected position of illumination spot 124, are now 114, 116, and 122. Now only three super pixels are actuated, as pixel 112 (FIG. 7B) is no longer illuminated by any significant portion of illumination spot 124. As in FIGS. 7A-B, arrow 118 indicates the direction of the scan, with the expected position of illumination spot 124 at $t=t_{i+1}$ determined from the knowledge of the state of beam steering device 24. In the pictured embodiment, each super pixel will be exposed to the image of illumination spot 26 for seven scan steps, thus improving the signal-to-noise ratio.

Due to the fact that the length of the elliptical illumination spot is much larger than the super pixel, the resolution in the direction of the scan is determined by the super pixel size. As the super pixel size is a third of the length of the elliptical illumination spot along its fast (long) axis, the resolution obtained in the direction of the scan line is three times as good (a third in numerical value) as that obtained with the elliptical illumination spot alone. The averaging area for the distance measurement is the area of a super pixel.

In FIGS. 5-7, an ideal shape (circular or elliptical) has been used as the shape of the image of illumination spot 26 on detector array 28. In an embodiment of the present invention, control circuit 38 calculates (or looks up) the actual shape of the illumination spot image on the detector array, and the results of this calculation are used in choosing the sensor elements to be activated at each point in the scan. The calculation takes into account the effects of the design of beam steering device 24, its scanning movement characteristics, the exact state of the beam steering device, and the angle between the beam from laser light source 20 and the beam steering device, as they impact on the shape, direction of movement, and orientation of the image of illumination spot 26. In addition, the dependence of the image on the distance between the LiDAR device and target scene 22 is taken into account. This effect is significant, especially for target scene ranges that are short as compared to the separation distance between beam steering device 24 and collection optics 27. The above calculations are performed in order to obtain the best overlap between actuated sensing elements 44 and illumination spot 26 image on detector array 28, while achieving the desired vertical and horizontal angular resolution, thus optimizing the signal-to-background and signal-to-noise figures.

Figure 8:
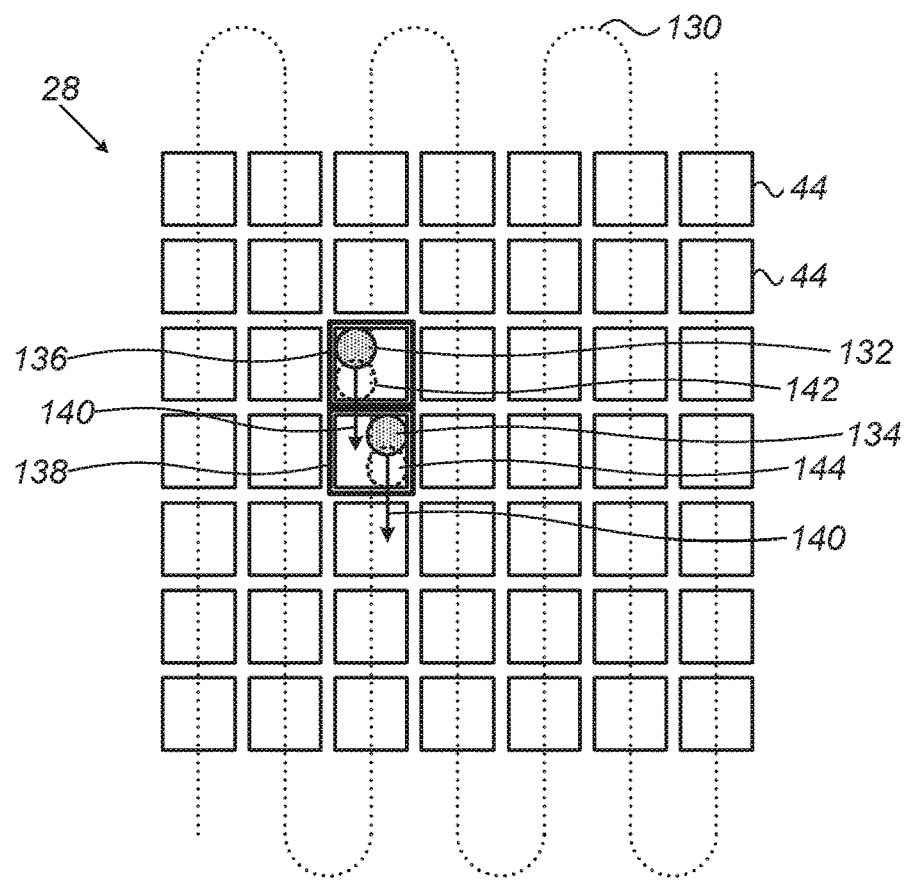
FIG. 8 is a schematic illustration of a detector array with two circular illumination spots scanned in a two-dimensional raster scan, in accordance with an embodiment of the invention.

FIG. 8 is a schematic illustration showing a technique for enhancement of the resolution of a raster-scanning LiDAR, in accordance with an embodiment of the invention. Beam steering device 24 scans the images of illumination spots 26 (FIG. 1) on detector array 28 in a raster scan pattern 130 down one column and up the next column of the detector array. If only one illumination spot were to be used, the lateral resolution perpendicular to the scan lines of the raster scan would be the pitch of sensing elements 44. In the present embodiment, however, the lateral resolution is doubled by using two scanned illumination spots 26, whose images on detector array 28 are separated along the scan line by a distance equal to the pitch of sensing elements 44, and transversely to the scan line by half of this pitch. Beam steering device 24 and the repetition rate of laser light source 20 are configured so that successive illumination spots are separated by steps of half the pitch of sensing elements 44 in the direction of the scan line of the raster scan. Each super pixel comprises one sensing element 44.

FIG. 8 shows schematically the images of two illumination spots 26 at two consecutive points in time: $t=t_i$ and $t=t_{i+1}$. At the time $t=t_i$, the images of the illumination spots are a spot 132 and a spot 134, with spot 132 inside a super pixel 136, and spot 134 inside a super pixel 138. All other super pixels are turned off. At the time $t=t_{i+1}$, both spots have moved down, as indicated by arrows 140, by half a super pixel, to new positions 142 and 144. The spots are still inside the same super pixels 136 and 138 as at $t=t_i$, but the positions of illumination spots 142 and 144 are determined by the state of beam steering device 24 at the time $t=t_{i+1}$. Due to the fact that the two spots are at all times assigned to separate super pixels, the spots are individually identifiable, and the resolution of the LiDAR transversely to the scan line is determined by the separation of the images of the two illumination spots 26 in that direction, rather than the pitch of sensing elements 44, thus mitigating the miniaturization requirements for detector array 28. The averaging area of distance measured by each of illumination spots 26 is the area of that illumination spot.

In another embodiment (not shown in the figures) the number of scanned illumination spots 26 is increased to more than two (as compared to FIG. 8), with the illumination spots separated along raster scan pattern 130 so that the image of each illumination spot is located in a different sensing element 44. For an embodiment in which the images of N illumination spots 26 are all within one column of detector array 28, the resolution transversely to raster scan 130 is given by dividing the pitch of sensing elements 44 by N.

Linear Scan Patterns

Figure 11:
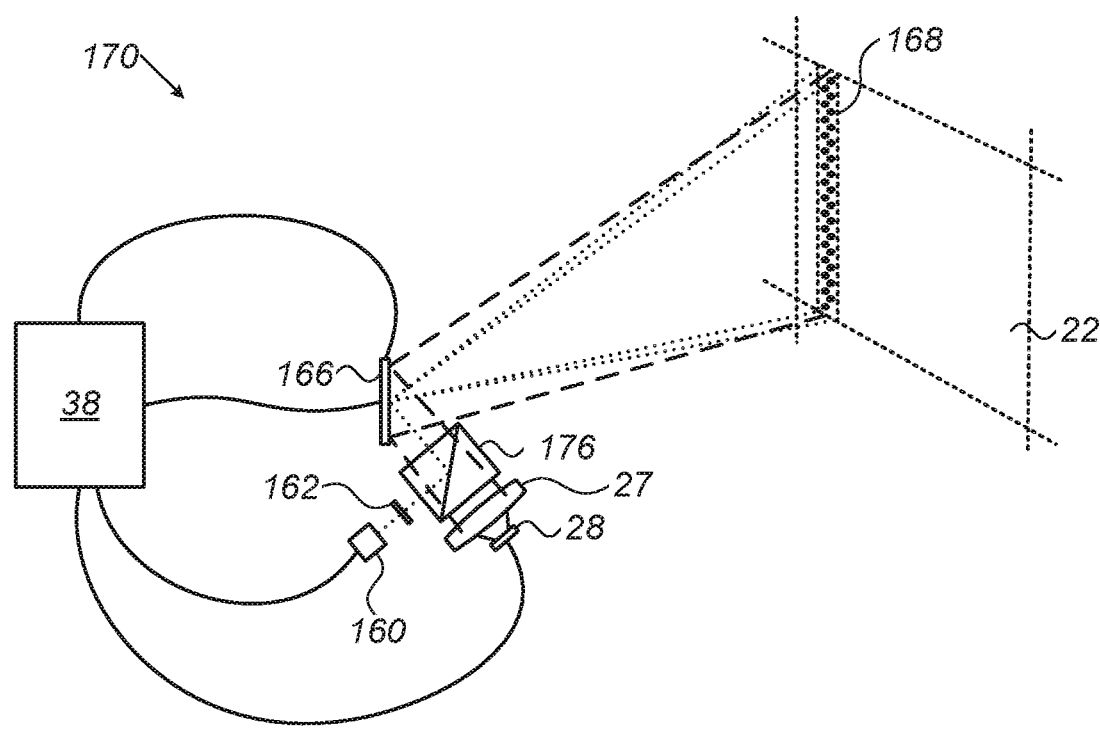
FIG. 11 is a schematic illustration of a LiDAR device implementing a one-dimensional scan, in accordance with another embodiment of the invention.

FIGS. 9-11 are schematic illustrations showing a LiDAR based on a linear scan, in accordance with an embodiment of the invention. A linear (one-dimensional) scan has the advantage that it utilizes a potentially smaller, cheaper, and more reliable design of the beam steering device than that required for a two-dimensional scan. The resolution in the direction of the linear scan is determined by the resolution of the beam steering device. As no scan takes place transversely to the direction of the linear scan, resolution in that direction is accomplished by using multiple illumination spots 26 arrayed across target scene 22.

FIG. 9 is a schematic illustration showing a one-dimensional scan as imaged onto detector array 28, in accordance with an embodiment of the invention. The resolution of the LiDAR in the direction perpendicular to the linear scan is improved beyond the pitch of sensing elements 44 by using a pattern 150 of images of illumination spots 26 comprising two staggered columns 151 and 152, with circles 153 denoting the expected positions of the images of the individual illumination spots on sensor array 28. Arrows 154 indicate the direction of the scan.

In each column 151 and 152 of pattern 150, the spacing of the images of illumination spots 26, as indicated by circles 153, along the axis of the respective column is equal to the pitch of sensing elements 44. The two columns 151 and 152 are mutually offset by half of the pitch of sensing elements 44 in the direction of the axes of the columns. Columns 151 and 152 are spaced in the direction of the scan by one pitch in order to assign the two columns to separate sensing elements. In some embodiments (not shown in figure), the resolution transverse to the linear scan is further improved by using more than two columns of illumination spots 26 with smaller mutual offsets in the direction of the axes of the columns. Thus, for example, using four columns with mutual offsets of a quarter pitch of sensing elements 44, a resolution of one quarter pitch is achieved.

FIG. 10 is a schematic illustration showing a LiDAR 159 based on a one-dimensional scan, in accordance with an embodiment of the invention. The beam from a single pulsed laser source 160 is split by a diffractive optical element (DOE) 162 into two staggered columns of multiple beams. These beams are directed to and scanned over target scene 22 by a single-axis beam-steering device 166, forming two staggered columns of illumination spots 168 on target scene 22. The illumination spots are imaged by collection optics 27 onto detector array 28, forming two staggered columns 151 and 152 in pattern 150 as shown in FIG. 9.

Only sensing elements 44 that contain images of illumination spots 26 in pattern 150 are actuated at any given instant during the scan, with the remaining sensing elements turned off, thus preventing unnecessary integration of background light, and achieving a high signal-to-background ratio. Similarly to FIG. 1, control circuit 38 is connected to laser light source 160, beam steering device 166, and detector array 28, controlling their functions and collecting data to determine the distance to target scene 22 by using time-of-flight data.

FIG. 11 is a schematic illustration showing a LiDAR 170 based on a one-dimensional scan and a co-axial optical architecture, in accordance with another embodiment of the invention. The beam from a single pulsed laser source 160 is split by DOE 162 into two staggered columns of multiple beams. These beams pass through a polarizing beamsplitter 176, and are directed to and scanned over target scene 22 by single-axis beam-steering device 166, thus forming two staggered columns of illumination spots 168. The illumination spots, reflected from target scene 22, are imaged through beam steering device 166, polarizing beamsplitter 176, and collection optics 27 onto detector array 28, forming two staggered columns 151 and 152 in pattern 150 as shown in FIG. 9.

Due to the co-axial architecture of optical transmission and collection, pattern 150 on detector array is (nearly) stationary with respect to the scan. Therefore, the number of columns of sensor elements 44 on the detector array along the axis perpendicular to the direction of the scan may be considerably smaller than the number of rows of sensor elements along the scan direction. Similarly to FIG. 1, control circuit 38 is connected to laser light source 160, beam steering device 166, and detector array 28, controlling their functions and collecting data to determine the distance to target scene 22 using time-of-flight data.

In both of the embodiments that are shown in FIGS. 10 and 11, the lateral resolution perpendicular to the scan direction is half of the pitch of sensing elements 44, and the resolution along the scan is determined by the scan rate of beam steering device 166 and the pulse repetition rate of laser source 160. Each one of illumination spots 168 averages the distance measurement over the area of that spot.

The vertical orientation of columns 151 and 152 in pattern 150 is shown here by way of example, and alternative orientations implementing similar principles are considered to be within the scope of the present invention.

Multi-Range Sensing

Figure 12:
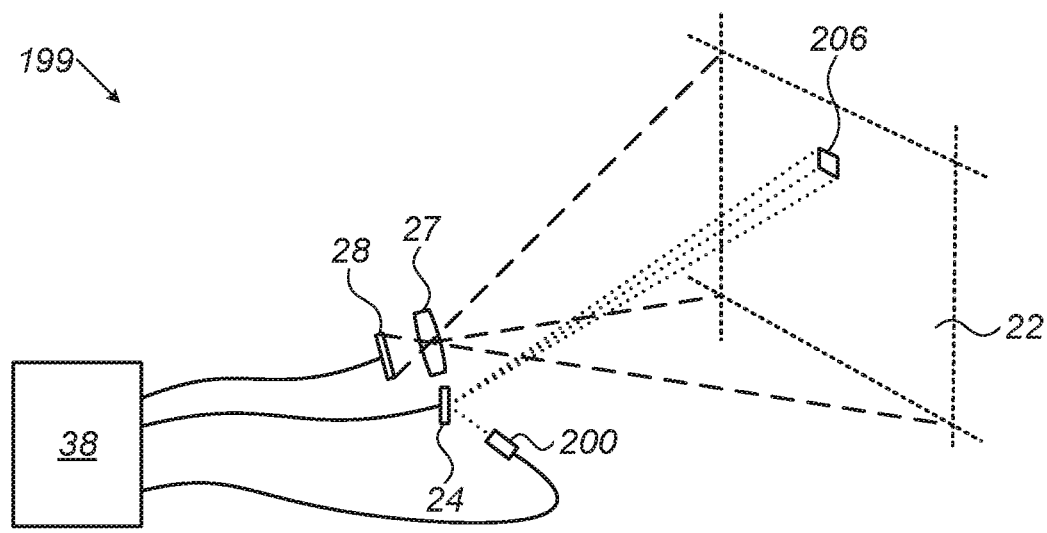
FIG. 12 is a schematic illustration of a LiDAR device using a laser light source with adjustable emissive power, in accordance with an embodiment of the invention.
Figure 13:
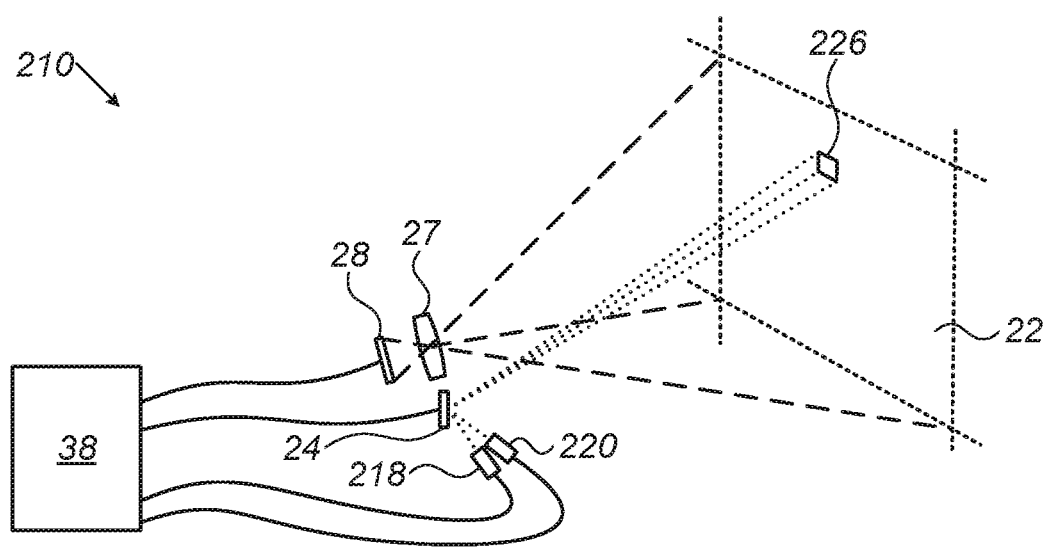
FIG. 13 is a schematic illustration of a LiDAR device using two laser light sources with different emissive powers, in accordance with an embodiment of the invention.

FIGS. 12-13 are schematic illustrations showing LiDARs that adapt themselves to near and far distances of the target scene, in accordance to embodiments of the invention.

FIG. 12 is a schematic illustration showing a LiDAR 199, which adapts itself for measuring distances to both near and far target scene points, in accordance with an embodiment of the invention. The beam of a pulsed laser light source 200 is directed to target scene 22 by dual-axis beam-steering device 24, forming an illumination spot 206 on and scanning the spot over the target scene. Illumination spot 206 is imaged onto detector array 28 by collection optics 27. Control circuit 38 is connected to laser light source 200, beam steering device 24, and detector array 28.

Laser light source 200 has the capability to emit light at two power levels: low emissive power and high emissive power, under control of signals from control circuit 38. Concomitantly, sensing elements 44 of detector array 28 (see FIG. 2) have the capability to operate in two distinct modes: short-range mode and long-range mode. For a given mode of operation of a specific sensing element, control circuit 38 will adjust its timing and sensitivity, as well as the signal processing algorithms for optimal performance in that mode. Typically, in short-range mode, sensing elements 44 are biased for relatively lower sensitivity (which also results in lower noise) and gated to sense short times of flight. In the long-range mode, sensing elements 44 are biased for relatively higher sensitivity and gated to sense longer times of flight, thus reducing the likelihood of spurious detection of short-range reflections.

To determine the required mode of operation for each area of target scene 22, the area is first scanned using laser light source 200 at its low emissive power level, suitable for short-range detection. The sensing elements 44 in detector array 28 receiving the light originating from laser light source 200 are actuated with their timing, sensitivity, and associated signal processing algorithms set for short-range distance measurement.

Following this short-range scan, control circuitry 38 controls LiDAR 199 to perform a long-range scan only in the areas in which, based on predetermined criteria, the short-range, low-power scan did not yield a sufficiently robust distance measurement. In the long-range scan, the measurement for these areas is repeated using the high emissive power level of light source 200, with appropriate changes in the timing, sensitivity, and algorithms of sensing elements 44 that are actuated to receive the reflected light from these areas.

FIG. 13 is a schematic illustration showing a LiDAR 210, which adapts itself for measuring distances to both near and far target scene points, in accordance with another embodiment of the invention. The beams of two pulsed laser light sources 218 and 220 are directed to target scene 22 by dual-axis beam-steering device 24, forming an illumination spot 226 on and scanning it over target scene 22. (The separation between laser light sources 218 and 220 is exaggerated in FIG. 13 in order to show the two separate sources). As will be detailed below, only one of the laser light sources is emitting at one given time. Illumination spot 226 is imaged onto detector array 28 by collection optics 27. Control circuit 38 is connected to laser light sources 218 and 220, beam steering device 24, and detector array 28.

Each laser light source 218, 220, when actuated, emits at a specific emissive power level, with laser light source 218 emitting at a low emissive power level, and laser light source 220 emitting at a high emissive power level. Control circuit 38 chooses which of the laser light sources to actuate at each point in the scan based on the sorts of criteria explained above with reference to FIG. 12. Similarly, sensing elements 44 of detector array 28 (see FIG. 2) have the capability to operate in two distinct modes: short-range mode and long-range mode. For a given mode of operation of a specific sensing element 44, control circuit 38 will adjust its timing and sensitivity as well as its signal processing algorithms for optimal performance in that mode.

To determine the required mode of operation in a given area of target scene 22, the area is first scanned using low emissive power laser light source 218. Those sensing elements 44 in detector array 28 that receive the light originating from laser light source 218 are actuated, with their timing, sensitivity, and associated signal processing algorithms set for short-range distance measurement. As in the preceding embodiment, if control circuit 38 determines that a sufficiently robust distance measurement cannot be made for a given area using laser light source 218, the measurement for that area is repeated at higher emissive power laser using light source 220, with appropriate changes in the timing, sensitivity, and algorithms of those of sensing elements 44 that are actuated for receiving the light from laser light source 220.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. An electro-optical device, comprising:
   a laser light source and
   a beam steering device configured to emit and scan at least two beams of light across a target scene;
   an array of sensing elements, each sensing element configured to output a signal indicative of incidence of photons on the sensing element;
   light collection optics configured to image the target scene scanned by the at least two beams of light onto the array,
   wherein the beam steering device scans the at least two beams across the target scene with a spot size and scan resolution that are smaller than a pitch of the sensing elements,
   wherein the laser light source and the beam steering device are configured to scan the at least two beams along different, respective beam axes, such that during the scan, the light collection optics image respective areas of the target scene that are illuminated by the at least two beams onto different, respective ones of the sensing elements; and
   circuitry coupled to actuate the sensing elements only in a selected region of the array and to sweep the selected region over the array in synchronization with scanning of the at least two beams.

2. The device according to claim 1, wherein the circuitry is configured to select the region such that at any instant during the scan, the selected region contains a part of the array onto which the light collection optics image an area of the target scene that is illuminated by the at least two beams.

3. The device according to claim 2, wherein the selected region comprises one sensing element.

4. The device according to claim 2, wherein the selected region comprises multiple sensing elements.

5. The device according to claim 1, wherein the circuitry is configured to process signals output by the sensing elements in order to determine respective distances to points in the target scene.

6. The device according to claim 1, wherein the sensing elements comprise single-photon detectors.

7. The device according to claim 6, wherein the single-photon detectors are single-photon avalanche diodes (SPADs).

8. The device according to claim 1, wherein the beam steering device is configured to scan the at least two beams across the target scene in a two-dimensional scan, and the circuitry is configured to sweep the selected region over the array in a two-dimensional pattern corresponding to the two-dimensional scan.

9. The device according to claim 1, wherein the two-dimensional scan forms a raster pattern, and wherein the respective beam axes of the at least two beams are mutually offset transversely relative to a scan line direction of the raster pattern.

10. The device according to claim 1, wherein the beam steering device is configured to scan the at least two beams across the target scene in a linear scan in a first direction, and wherein the at least two beams comprise multiple beams arranged along a column axis in a second direction, perpendicular to the first direction.

11. The device according to claim 10, wherein the multiple beams are arranged in at least two columns, having respective column axes that are orthogonal to the first direction of the scan and are mutually offset.

12. A method for sensing, comprising:
   emitting and scanning at least two beams of light across a target scene;
   providing an array of sensing elements, each sensing element configured to output a signal indicative of incidence of photons on the sensing element;
   imaging the target scene scanned by the at least two beams of light onto the array,
   wherein the at least two beams are scanned across the target scene with a spot size and scan resolution that are smaller than a pitch of the sensing elements, and
   wherein the at least two beams are scanned along different, respective beam axes, such that during the scan, light collection optics image respective areas of the target scene that are illuminated by the at least two beams onto different, respective ones of the sensing elements; and
   actuating the sensing elements only in a selected region of the array and sweeping the selected region over the array in synchronization with scanning of the at least two beams.

13. The method according to claim 12, wherein actuating the sensing elements comprises selecting the region such that at any instant during the scan, the selected region contains a part of the array onto which light collection optics image an area of the target scene that is illuminated by the at least one beam.

14. The method according to claim 12, and comprising processing signals output by the sensing elements in order to determine respective distances to points in the target scene.

15. The method according to claim 12, wherein the sensing elements comprise single-photon detectors.

16. The method according to claim 12, wherein scanning the at least two beams comprises scanning the at least two beams across the target scene in a two-dimensional scan, and actuating the sensing elements comprises sweeping the selected region over the array in a two-dimensional pattern corresponding to the two-dimensional scan.

17. The method according to claim 16, wherein the two-dimensional scan forms a raster pattern, and wherein the respective beam axes of the at least two beams are mutually offset transversely relative to a scan line direction of the raster pattern.

18. The method according to claim 12, wherein scanning the at least two beams comprises scanning the at least two beams across the target scene in a linear scan in a first direction, and wherein the at least two beams comprise multiple beams arranged along a column axis in a second direction, perpendicular to the first direction.

* * * * *